Patented Feb. 14, 1950

2,497,817

UNITED STATES PATENT OFFICE 2,497,817

STABILIZATION OF EGGS

Cedric Hale, Glen Ellyn, and Paul Schauert, Chicago, Ill., assignors to Swift & Company, Chicago, Ill., a corporation of Illinois No Drawing. Application March 29, 1949,
Serial No. 84,262

6 Claims. (Cl. 99—161)

This invention relates to a method of heat stabilizing shell eggs.

It has heretofore been proposed to heat stabilize shell eggs by subjecting the same to temperatures of approximately 110° F. to 132° F. or above for varying lengths of time. Such a process has been found to possess certain advantages in that the bacteria in the eggs were killed or rendered inactive. Such a process has the disadvantage that the palatability was impaired on holding under adverse time and temperature conditions. It was also ascertained that in such a process some white thickened or jelled excessively, assumed a whitish tint, and tended to precipitate next to the shell membrane. Large and small eggs, as well as thick and thin-shelled eggs, behaved differently.

As a result of extensive experimental work, we have ascertained that the advantages of the process aforesaid can be retained without, however, suffering its disadvantages.

Our invention is based upon the discovery that shell eggs can be more efficaciously stabilized if the same are subjected to successive bath heat treatments. Thus, in carrying out our invention, we submerge the eggs in a liquid, such as water, which is maintained at a temperature of approximately 130° F. for approximately seven minutes; and then we submerge the eggs in liquid, such as water, which is maintained at approximately 136° F. for approximately seven minutes. The eggs are thereafter air dried and submerged in a light mineral oil at room temperature. Preferably, the eggs before being subjected to successive fluid heat baths are precandled. Extensive tests indicate that the eggs so treated by this succession method retain "fresh egg" quality when held under adverse temperature conditions to an extent substantially greater than the untreated eggs. Palatability and appearance are both preserved. Considerable bacterial destruction is effected. In operation, the machine for carrying on the process is capable of handling approximately 47 cases of eggs per hour. The whites of the eggs do not thicken appreciably or jell excessively, nor assume a whitish tint or precipitate next to the shell membrane; and the process, moreover, is versatile with substantially uniform results, irrespective of whether the eggs are large or small and irrespective of whether the shells are thick or thin.

Another attribute of this two-stage process is that oil is conserved for use in the final oil bath treatment, and, moreover, the two-step process eliminates the necessity of pretempering eggs at any given temperature as must be done when practicing the process hereinafter described wherein the eggs are treated in only one bath at a high temperature. Gelation and discoloration of the white of the egg are also prevented when using the two-step process.

Instead of water, other liquids which do not adversely affect the eggs may be used in the bath. Examples of such inert liquids which have been found satisfactory are glycerine and oil. A vegetable or mineral oil or mineral compound, such as commercially used in dipping eggs, are suitable for this purpose. Such oils are referred to in patents, such as Howard, 1,862,508, and others.

In summary, our invention has unexpectedly produced the new results aforesaid by the employment of a two-step bath treatment in which the temperature of the bath is increased during the second treatment.

Obviously, many modifications and variations of the invention as hereinbefore set forth may be made without distinguishing from the spirit and scope thereof, and therefore only such limitations should be imposed as are indicated in the appended claims.

This application is a continuation-in-part of our copending application Serial No. 572,427, filed January 11, 1945, now abandoned.

We claim:

1. A process for the treatment of shell eggs which comprises the steps of subjecting such eggs to a heat treatment with a liquid at about 130° F. for about 7 minutes and thereafter subjecting the eggs to a separate heat treatment with a liquid at a temperature of about 136° F. for about 7 minutes, whereby the fresh quality of the eggs is retained to a greater extent than the untreated eggs, bacteria are destroyed, and the albumen is preserved in thick, untinted condition.

2. A two-step process for the treatment of shell eggs which comprises contacting the shells of such eggs with a liquid maintained at a temperature of about 130° F. for about 7 minutes and thereafter contacting the shells of the eggs with another liquid at a temperature of about 136° F. for about the same length of time as the first liquid treatment, whereby the fresh quality of the eggs is retained to a greater extent than the untreated eggs, bacteria are destroyed, and the albumen is preserved in thick, untinted condition.

3. A two-step process for the treatment of shell eggs which comprises subjecting such eggs to a liquid bath maintained at a temperature of about 130° F. for about 7 minutes and thereafter subjecting the eggs to another liquid bath treatment at a temperature of about 136° F. for about the same length of time as the first bath treatment, whereby the fresh quality of the eggs is retained to a greater extent than the untreated eggs, bacteria are destroyed, and the albumen is preserved in thick, untinted condition.

4. A process as defined in claim 3 wherein the liquid bath is oil.

5. A process as defined in claim 3 wherein the liquid bath is glycerine.

6. A process for the treatment of shell eggs which comprises the steps of subjecting such eggs to heat treatment in a water bath at about 130° F. for about 7 minutes and thereafter subjecting the eggs to heat treatment in a water bath at about 136° F. for about 7 minutes, whereby bacteria are destroyed, and the fresh quality and the natural condition of the albumen are preserved for a longer time in the treated eggs than in the untreated eggs.

CEDRIC HALE.
PAUL SCHAUERT.

REFERENCES CITED

The following references are of record in the file of this patent:

UNITED STATES PATENTS

| Number | Name | Date |
|---|---|---|
| 1,862,508 | Howard | June 7, 1932 |

OTHER REFERENCES

"U. S. Egg and Poultry Magazine," July 1943, by Barott et al., pages 320, 321 and 322.

"Food Research," Sept.-Oct. 1944, by Romanoff et al., pages 358 to 366 inclusive.